(12) United States Patent
Tunno et al.

(10) Patent No.: US 11,866,925 B2
(45) Date of Patent: Jan. 9, 2024

(54) EXTENDABLE DRAIN AND SPRINKLER

(71) Applicant: SandSave, LLC, Fernandina Beach, FL (US)

(72) Inventors: Robert U. Tunno, Pittsburgh, PA (US); Richard M. Amendolea, Columbiana, OH (US)

(73) Assignee: SandSave, LLC, Fernandina Beach, FL (US)

( * ) Notice: Subject to any disclaimer, the term of this patent is extended or adjusted under 35 U.S.C. 154(b) by 288 days.

(21) Appl. No.: 17/470,290

(22) Filed: Sep. 9, 2021

(65) Prior Publication Data

US 2022/0081890 A1    Mar. 17, 2022

Related U.S. Application Data

(60) Provisional application No. 63/077,032, filed on Sep. 11, 2020.

(51) Int. Cl.
  *E03F 5/04* (2006.01)
  *B05B 3/00* (2006.01)
  *B05B 15/74* (2018.01)

(52) U.S. Cl.
  CPC ............ *E03F 5/04* (2013.01); *B05B 3/00* (2013.01); *B05B 15/74* (2018.02); *E03F 2005/0413* (2013.01)

(58) Field of Classification Search
  CPC ............. E03F 5/04; E03F 2005/0412; E03F 2005/0413
  See application file for complete search history.

(56) References Cited

U.S. PATENT DOCUMENTS

| | | | |
|---|---|---|---|
| 2,912,111 A | 11/1959 | Kovac, Jr. | |
| 4,486,122 A * | 12/1984 | Arntyr | E03F 5/0401 137/846 |
| 8,591,148 B2 | 11/2013 | Moody | |
| 10,077,536 B2 | 9/2018 | Druce | |
| 10,653,907 B1 | 5/2020 | Yoder | |
| 2003/0198514 A1 | 11/2003 | McCampbell | |
| 2013/0048121 A1 | 2/2013 | Glazik et al. | |

FOREIGN PATENT DOCUMENTS

| | | |
|---|---|---|
| WO | 2010142992 A1 | 12/2010 |
| WO | 2016077873 A1 | 5/2016 |

* cited by examiner

*Primary Examiner* — Janine M Kreck
(74) *Attorney, Agent, or Firm* — The Webb Law Firm

(57) ABSTRACT

An extendable drain configured to move between a retracted position and an extended position includes a housing and a drain member. The housing includes a top, a bottom, and a sidewall including an annular stretchable sleeve. The housing defines an interior volume configured to be at least partially filled by a fluid causing the annular sleeve to stretch axially, thereby increasing a distance between the top of the housing and the bottom of the housing. The drain member includes an open top fixed to the top of the housing, an open bottom, and a sidewall extending between the top and the bottom of the drain member through the interior volume of the housing. At least partially filling the interior volume of the housing moves the drain member axially causing the sleeve to stretch, thereby increasing the distance between the top of the housing and the bottom of the housing.

19 Claims, 8 Drawing Sheets

EXTENDABLE DRAIN AND SPRINKLER

CROSS REFERENCE TO RELATED APPLICATION

The present application claims the benefit of U.S. Provisional Patent Application No. 63/077,032, filed Sep. 11, 2020, the disclosure of which is hereby incorporated by reference in its entirety.

BACKGROUND

Technical Field

This disclosure is directed to extendable drains and sprinklers and, in particular, to drains and sprinklers that automatically extend or retract including a housing defining an interior volume or cavity that is filled by a fluid to move the drain or sprinkler to an extended position.

Technical Description

Golf course sand traps or bunkers (referred to hereinafter as "bunkers") are shallow pits partially filled or covered with silt or sediment (e.g., sand). Bunkers generally have a raised lip or barrier, which makes the ball more difficult to play than from hard and flat surfaces (e.g., the fairway or rough grass). Bunkers can be one of the most expensive landscape features of a golf course to build and maintain, and are generally formed by excavating a hole or pit in the ground. An arrangement of perforated drainpipes (e.g., a French drain system) can be provided in the bottom of the pit to channel water away from the bunker. A permeable fabric cover is placed over the arrangement of pipes to separate the bunker from earth. The bunker is then filled with sand to a depth of about 2.0 inches to 6.0 inches over the cover. Over time, the permeable cover can become clogged with debris, such as silt or dust, preventing water from efficiently passing through the cover to the arrangement of perforated drainpipes. As a result, during heavy rain, water collects in the bunker. Often, the water must be pumped out of the bunker by the golf course maintenance crew. Alternatively, golf course users may wait for the water in the bunker to evaporate before resuming play.

Various devices are known for channeling water from a bunker into an underground drainage system. For example, U.S. Patent Appl. Pub. No. 2003/0198514 (hereinafter "the '514 publication") discloses a subsurface drain system 20 for a golf bunker including a buried perforated drain conduit 22 and a riser conduit 30 mounted to the drain conduit that is configured to move between an extended position (FIG. 3) and a retracted position (FIG. 2). In order to move the riser conduit 30 to the extended position, a user (e.g., a golf course maintenance worker) grasps a lift handle (U-bolt 3) on the top cap or plug 2 of the riser conduit 30 to lift the riser conduit 30 to the extended position. See paragraphs [0013] and [0024] of the '514 publication.

Other exemplary drains for golf course bunkers are disclosed in U.S. Pat. No. 10,077,536, entitled "Drainage system", and PCT Appl. Pub. No. WO 2010/142992, entitled "Drainage device".

SUMMARY

According to some non-limiting embodiments or aspects, provided is an extendable drain configured to move between a retracted position and an extended position. The drain includes a housing and a drain member. The housing includes a top, a bottom, and a sidewall extending between the top and the bottom of the housing, which includes an annular stretchable sleeve. The housing defines an interior volume configured to be at least partially filled by a fluid causing the annular sleeve to stretch axially, thereby increasing a distance between the top of the housing and the bottom of the housing. The drain member includes an open top fixed to the top of the housing, an open bottom, and a sidewall extending between the top and the bottom of the drain member through the interior volume of the housing. At least partially filling the interior volume of the housing moves the drain member axially causing the sleeve to stretch, thereby increasing the distance between the top of the housing and the bottom of the housing.

According to some non-limiting embodiments or aspects, provided is a drainage system for a bunker. The system includes a plurality of any of the previously described extendable drains at least partially buried below a surface of the bunker. The system also includes at least one drain conduit fluidly connected to the drain members of the plurality of extendable drains. The at least one drain conduit is positioned so that water flowing through the drain members of the plurality of extendable drains flows into the drain conduit and away from the bunker.

According to some non-limiting embodiments or aspects, provided is an extendable sprinkler including: a support conduit comprising an inflow portion configured to be connected to a water supply conduit and an outflow portion; a riser conduit extending through an opening of the outflow portion of the support conduit; a sprinkler nozzle connected to the riser conduit configured to expel water that passes through the support conduit and the riser conduit to the sprinkler nozzle; and an annular inflatable bladder. The annular inflatable bladder includes a proximal portion connected to the support conduit and a distal portion connected to the riser conduit or sprinkler nozzle, configured to extend axially causing the riser conduit to move from a retracted position to an extended position under force of water flowing through the supply conduit and the riser conduit.

According to some non-limiting embodiments or aspects, provided is a sprinkler system including a plurality of extendable sprinklers and at least one water supply conduit fluidly connected to the extendable sprinklers configured to deliver water from a water source to support conduits of the plurality of extendable sprinklers. The extendable sprinklers include: the support conduit having an inflow portion configured to be connected to a water supply conduit and an opposing outflow portion; a riser conduit extending through an opening of the outflow portion of the support conduit; a sprinkler nozzle connected to the riser conduit configured to expel water that passes through the support conduit and the riser conduit to the sprinkler nozzle; and an annular inflatable bladder. The annular inflatable bladder includes a proximal portion connected to the support conduit and a distal portion connected to the riser conduit or sprinkler nozzle, configured to extend axially causing the riser conduit to move from a retracted position to an extended position under force of water flowing through the support conduit and the riser conduit. The plurality of extendable sprinklers are in the extended position when water is provided to the plurality of sprinklers from the water source. The plurality of extendable sprinklers are in the retracted position when water is not provided to the plurality of sprinklers from the water source.

Further non-limiting embodiments or aspects are set forth in the following numbered clauses.

Clause 1: An extendable drain configured to move between a retracted position and an extended position, the drain comprising: a housing comprising a top, a bottom, and a sidewall extending between the top and the bottom of the housing comprising an annular stretchable sleeve, the housing defining an interior volume configured to be at least partially filled by a fluid causing the annular sleeve to stretch axially, thereby increasing a distance between the top of the housing and the bottom of the housing; and a drain member comprising an open top fixed to the top of the housing, an open bottom, and a sidewall extending between the top and the bottom of the drain member through the interior volume of the housing, wherein at least partially filling the interior volume of the housing moves the drain member axially causing the sleeve to stretch, thereby increasing the distance between the top of the housing and the bottom of the housing.

Clause 2: The extendable drain of clause 1, wherein the drain is configured for draining water from a bunker, and wherein, in the retracted position, the top of the housing is below a surface of the bunker, and in the extended position, at least the top of the housing and the top of the drain member are above the surface of the bunker.

Clause 3: The extendable drain of clause 2, wherein the housing fully encloses the sidewall of the drain member, such that sand of the bunker is separated from the sidewall of the drain member as the extendable drain extends and/or retracts.

Clause 4: The extendable drain of clause 2 or 3, wherein the sidewall of the housing is free from seams or openings, thereby preventing sand from the bunker from entering the interior volume defined by the housing.

Clause 5: The extendable drain of any of clauses 1-4, wherein the sidewall of the housing further comprises an annular rigid body with an edge connected to an edge of the sleeve, such that an outer surface of the annular body is flush to an outer surface of the sleeve.

Clause 6: The extendable drain of any of clauses 1-5, wherein the top of the housing comprises an annular plate defining an opening, and wherein the top of the drain member is fixed to the plate and aligned to the opening of the plate.

Clause 7: The extendable drain of any of clauses 1-6, wherein the bottom of the housing is mounted to a sidewall of a drain conduit and wherein the bottom of the drain member is positioned within the drain conduit, such that water flows through the drain member, through the open bottom of the drain member, and into the drain conduit.

Clause 8: The extendable drain of any of clauses 1-7, wherein the housing further comprises an inflow port connected to a fluid supply line for extending the drain, the inflow port being fluidly connected to the interior volume of the housing such that fluid passes from the fluid supply line and the inflow port into the interior volume of the housing to at least partially fill the interior volume of the housing.

Clause 9: The extendable drain of any of clauses 1-8, further comprising a piston fixedly connected to an outer surface of the sidewall of the drain member, the piston comprising a peripheral edge that seals against an inner surface of the sidewall of the housing.

Clause 10: The extendable drain of any of clauses 1-9, wherein the piston comprises an annular plate defining an opening having a diameter corresponding to an outer diameter of the drain member.

Clause 11: The extendable drain of any of clauses 1-10, wherein the piston separates the interior volume of the housing into a first volume and a second volume, and wherein at least partially filling the first volume moves the piston in a first direction causing the drain to move towards the extended position, and wherein at least partially filling the second volume moves the piston in a second direction causing the drain to move towards the retracted position.

Clause 12: The extendable drain of any of clauses 1-11, wherein the housing comprises a first inflow port connected to a first fluid supply line for extending the drain, the first inflow port being fluidly connected to the first volume of the housing such that fluid passes from the first fluid supply line and the first inflow port into the first volume of the housing to at least partially fill the first volume of the housing.

Clause 13: The extendable drain of any of clauses 1-12, wherein the housing comprises a second inflow port connected to a second fluid supply line for retracting the drain, the second inflow port being fluidly connected to the second volume of the housing such that fluid passes from the second fluid supply line and the second inflow port into the second volume of the housing to at least partially fill the second volume of the housing and causing the drain to move towards the retracted position.

Clause 14: The extendable drain of any of clauses 1-13, wherein at least partially filling the second volume causes fluid contained in the first volume to pass through the first inflow port, thereby allowing the drain to retract.

Clause 15: The extendable drain of any of clauses 1-14, wherein the annular sleeve comprises an elastomeric material, such as silicone, neoprene, isoprene, or rubber.

Clause 16: The extendable drain of any of clauses 1-15, further comprising a cap movable between a retracted position, in which the cap covers the open top of the drain member, and an extended position in which the cap is separated from the open top of the drain member so that fluid flows past the cap into the drain member.

Clause 17: The extendable drain of any of clauses 1-16, further comprising an actuator that moves the cap between the retracted position and the extended position, the actuator comprising a first inflow port for receiving fluid from a first fluid supply line to push the cap to the extended position, and a second inflow port for receiving fluid from a second fluid supply line to retract the cap.

Clause 18: The extendable drain of any of clauses 1-17, wherein the sleeve is biased to the retracted position.

Clause 19: The extendable drain of any of clauses 1-18, further comprising a spring biased to the retracted position which contributes to movement of the drain from the extended position to the retracted position.

Clause 20: A drainage system for a bunker, the system comprising: a plurality of the extendable drains of any of clauses 1-19 at least partially buried below a surface of the bunker; and at least one drain conduit fluidly connected to the drain members of the plurality of extendable drains, wherein the at least one drain conduit is positioned so that water flowing through the drain members of the plurality of extendable drains flows into the drain conduit and away from the bunker.

Clause 21: The drainage system of clause 20, further comprising at least one fluid supply line for transporting water from at least one water source to interior volumes of the housings of the plurality of extendable drains to cause the plurality of extendable drains to move to the extended position.

Clause 22: The drainage system of clause 20 or 21, further comprising at least one valve for controlling flow of water from the at least one water source to the interior volumes of the housings of the plurality of extendable drains through the at least one fluid supply line.

Clause 23: The drainage system of any of clauses 20-22, further comprising one or more knobs for manually opening or closing the at least one valve to control the flow of water into the interior volume of the housings.

Clause 24: The drainage system of any of clauses 20-23, further comprising an automatic activation system comprising: at least one sensor configured to detect information indicating that water is collecting in the bunker, and at least one controller electrically connected to the at least one sensor and to the at least one valve for controlling water flow from the at least one water source to the plurality of extendable drains, the at least one controller configured to: receive and process signals from the at least one sensor, and cause the at least one valve to open when the received and processed signals indicate that water is collecting in the bunker, such that water flows from the water source, through the at least one valve, and into the interview volumes of the plurality of extendable drains.

Clause 25: The drainage system of any of clauses 20-24, wherein the at least one sensor comprises at least one of a moisture sensor, a water pressure sensor, an optical sensor, or any combination thereof.

Clause 26: An extendable sprinkler comprising: a support conduit comprising an inflow portion configured to be connected to a water supply conduit and an outflow portion; a riser conduit extending through an opening of the outflow portion of the support conduit; a sprinkler nozzle connected to the riser conduit configured to expel water that passes through the support conduit and the riser conduit to the sprinkler nozzle; and an annular inflatable bladder comprising a proximal portion connected to the support conduit and a distal portion connected to the riser conduit or sprinkler nozzle, configured to extend axially causing the riser conduit to move from a retracted position to an extended position under force of water flowing through the supply conduit and the riser conduit.

Clause 27: The extendable sprinkler of clause 26, further comprising a resilient member mounted between the riser conduit and the support conduit configured to move the riser conduit from the extended position to the retracted position.

Clause 28: The extendable sprinkler of clause 26 or clause 27, wherein the resilient member comprises a helical spring.

Clause 29: The extendable sprinkler of any of clauses 26-28, wherein the riser conduit comprises a distal flange portion extending radially outwardly from an open distal end of the riser conduit, and wherein the annular inflatable bladder is connected to a peripheral edge of the distal flange portion.

Clause 30: The extendable sprinkler of any of clauses 26-29, wherein the inflatable bladder encloses the outflow portion of the support conduit to prevent liquids and debris from entering the support conduit through an opening of the outflow portion of the support conduit.

Clause 31: A sprinkler system comprising: a plurality of extendable sprinklers, the extendable sprinklers comprising: a support conduit comprising an inflow portion configured to be connected to a water supply conduit and an opposing outflow portion; a riser conduit extending through an opening of the outflow portion of the support conduit; a sprinkler nozzle connected to the riser conduit configured to expel water that passes through the support conduit and the riser conduit to the sprinkler nozzle; an annular inflatable bladder comprising a proximal portion connected to the support conduit and a distal portion connected to the riser conduit or sprinkler nozzle, configured to extend axially causing the riser conduit to move from a retracted position to an extended position under force of water flowing through the support conduit and the riser conduit; and at least one water supply conduit fluidly connected to the extendable sprinklers configured to deliver water from a water source to the support conduits of the plurality of extendable sprinklers, wherein the plurality of extendable sprinklers are in the extended position when water is provided to the plurality of sprinklers from the water source, and wherein the plurality of extendable sprinklers are in the retracted position when water is not provided to the plurality of sprinklers from the water source.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. Hence, specific dimensions and other physical characteristics related to the embodiments disclosed herein are not to be considered as limiting. Further, it is to be understood that the disclosure may assume various alternative variations and step sequences, except where expressly specified to the contrary.

DETAILED DESCRIPTION

Figure 1A:
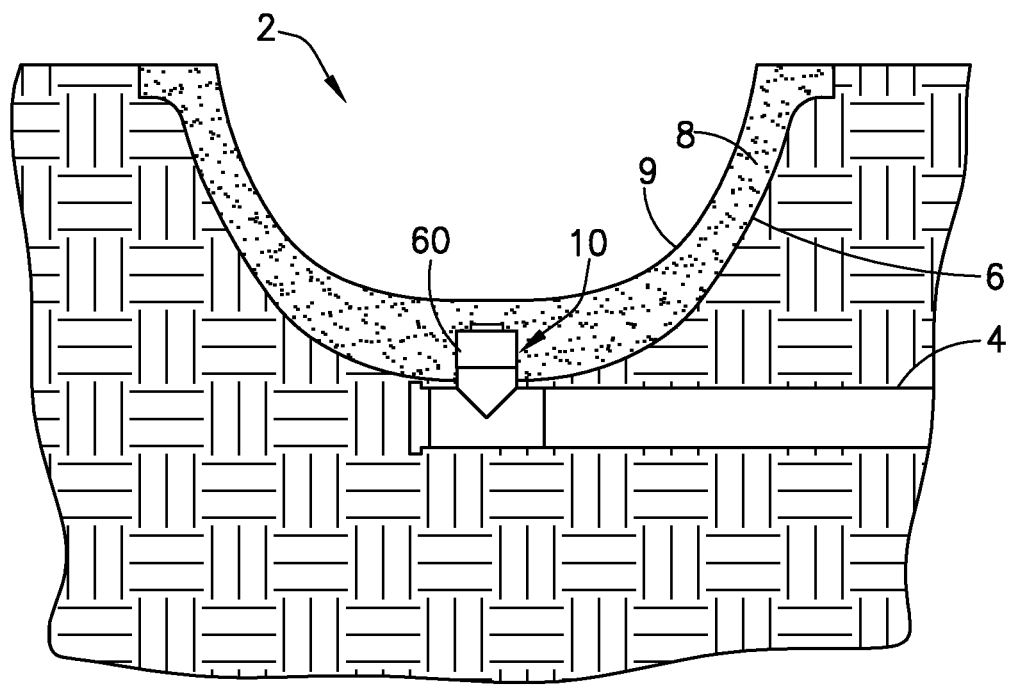
FIG. 1A is a schematic drawing of an extendable drain in a bunker in a retracted position, according to some non-limiting embodiments or aspects of the disclosure.

For purposes of the description hereinafter, the terms "end", "upper", "lower", "right", "left", "vertical", "horizontal", "top", "bottom", "up", "down", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

All numbers and ranges used in the specification and claims are to be understood as being modified in all instances by the term "about." By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first," "second," and the like are not intended to refer to any particular order or chronology, but refer to different conditions, properties, or elements.

The term "at least" is synonymous with "greater than or equal to."

As used herein, "at least one of" is synonymous with "one or more of." For example, the phrase "at least one of A, B, and C" means any one of A, B, or C, or any combination of any two or more of A, B, or C. For example, "at least one of A, B, and C" includes one or more of A alone; or one or more B alone; or one or more of C alone; or one or more of A and one or more of B; or one or more of A and one or more of C; or one or more of B and one or more of C; or one or more of all of A, B, and C.

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprises," "comprising," or any other variations thereof, are intended to cover a non-exclusive inclusion, such that a setup, device, or method that comprises a list of components or steps does not include only those components or steps but may include other components or steps not expressly listed or inherent to such setup, device, or method. In other words, one or more elements in a system or apparatus proceeded by "comprises . . . a" does not, without more constraints, preclude the existence of other elements or additional elements in the system or method.

The terms "includes," "including," or any other variations thereof are intended to cover a non-exclusive inclusion such that a setup, device, or method that includes a list of components or steps does not include only those components or steps but may include other components or steps not expressly listed or inherent to such setup, device, or method. In other words, one or more elements in a system or apparatus proceeded by "includes . . . a" does not, without more constraints, preclude the existence of other elements or additional elements in the system or method.

The terms "an embodiment," "embodiment," "embodiments," "the embodiment," "the embodiments," "one or more embodiments," "some non-limiting embodiments or aspects," and "one embodiment" mean "one or more (but not all) embodiments of the invention(s)" unless expressly specified otherwise. A description of an embodiment with several components in communication with each other does not imply that all such components are required. On the contrary, a variety of optional components is described to illustrate the wide variety of possible embodiments of the disclosure.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

As discussed herein, certain operations may be performed in a different order, modified, or removed. Moreover, steps may be added to methods described herein and still conform to the described embodiments. Further, operations described herein may occur sequentially or certain operations may be processed in parallel. Yet further, operations may be performed by a single processing unit or by distributed processing units.

In the following detailed description of the embodiments of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

An extendable drain 10 and draining system 110 including a plurality of extendable drains 10 are shown in FIGS. 1A-4. An extendable sprinkler 210 and sprinkler system 310 including a plurality of extendable sprinklers 210 are shown in FIGS. 5A-6. The drains 10 and sprinklers 210 of the present disclosure are configured to be partially buried below ground. Ground and earth materials, such as sand, dirt, silt, dust, gravel, and similar materials, are abrasive and can damage mechanical devices including components that move or slide relative to other components of the devices. In order to avoid such damage and prolong useful life of these devices, the drains 10 and sprinklers 210 of the present disclosure are constructed to prevent sand, silt, and other debris from damaging, collecting in, or contaminating an interior of the drains 10 or sprinklers 210. For example, the drains 10 and sprinklers 210 of the present disclosure can include smooth surfaces that are free from seams, openings, holes, gaps, or any other areas that would allow sand, silt, and other debris to enter the interior of the devices. The drains 10 and sprinklers 210 of the present disclosure may also include sidewalls that are smooth and free from protrusions, ridges, fins, flanges, and similar structures that may be difficult to push through sand, silt, or dirt as the drain 10 or sprinkler 210 moves to its extended position. Sand is a particularly abrasive substance. Accordingly, the drain 10 is constructed so that no openings or interfaces between different structural components of the drain 10 are in contact with sand. The sprinkler 210 is constructed in a similar manner, such that interfaces between structural components of the sprinkler 210 are protected and do not contact dirt, silt, sand, or other abrasive substances.

Extendable Drains

Figure 1B:
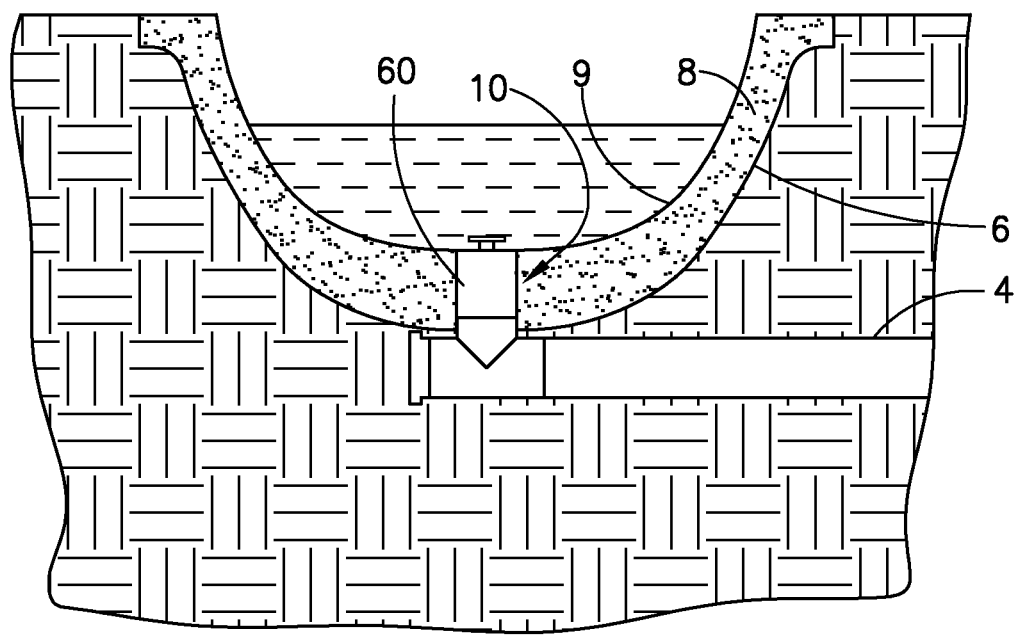
FIG. 1B is a schematic drawing of the extendable drain of FIG. 1A in the bunker in an extended position.

With specific reference to FIGS. 1A and 1B, in some non-limiting embodiments or aspects, the extendable drain 10 can be buried in a sand bunker 2 of a golf course and configured to drain water from the bunker 2. As discussed previously, the bunker 2 is a pit or depression including an arrangement of buried drain conduits 4, such as storm drainpipes, a permeable cover 6 covering the buried drain conduits 4 and earth, and an amount of sand 8 positioned in the bunker 2 over the cover 6. As used herein, a "conduit" can refer to a channel, tube, pipe, drainpipe, rod, hose, or similar hollow structure configured for conveying a fluid, such as water and/or gas, from a first location to a second location through the conduit. Fluid conveying conduits used for plumbing fixtures are often formed from corrosion resistant metal (e.g., brass, copper, galvanized steel, or stainless steel) or rigid plastics (e.g., polyvinyl chloride (PVC)). Conduits, such as pipes and tubes, often have a circular or substantially circular cross-section. The conduits of the present disclosure can have circular cross sections, or any other shape, without limitation, including elliptical, semi-circular, square, rectangular, or any other regular or irregular polygonal shape. The size (e.g., length, inner diameter, and outer diameter) for the conduits of the present disclosure can be selected based on the intended use for the conduits, as described in further detail herein.

As shown in FIGS. 1A and 1B, the drain 10 extends from the buried drain conduits 4 through the cover 6 and towards a surface of the sand 8. The drain 10 is configured to transition from a retracted position (shown in FIG. 1A), in which the drain 10 is entirely or at least partially below the surface of the sand 8, to an extended position (shown in FIG. 1B), in which a distal or top portion of the drain 10 protrudes above the surface of the sand 8, in order to drain water pooled in the bunker 2 into the arrangement of conduits 4 buried beneath the bunker 2. As described in further detail herein, the drain 10 can be configured to automatically move between the retracted position (FIG. 1A) and the extended position (FIG. 1B). For example, the drain 10 can include sensors and automatically controlled actuators, pistons, valves, or other electromechanical components that cause the drain 10 to extend when water is detected in the bunker 2. The drain 10 can also be configured to automatically move from the extended position to the retracted position once all or substantially all water has drained from the bunker 2 into the drain conduits 4. Once the drain 10 is in the retracted position, a user (e.g., a golf course maintenance worker) may manually rake the sand 8 over the retracted drain 10 to ensure that the drain 10 does not interfere with play. Once the drain 10 is covered by a sufficient depth of sand 8, play can resume.

Figure 2A:
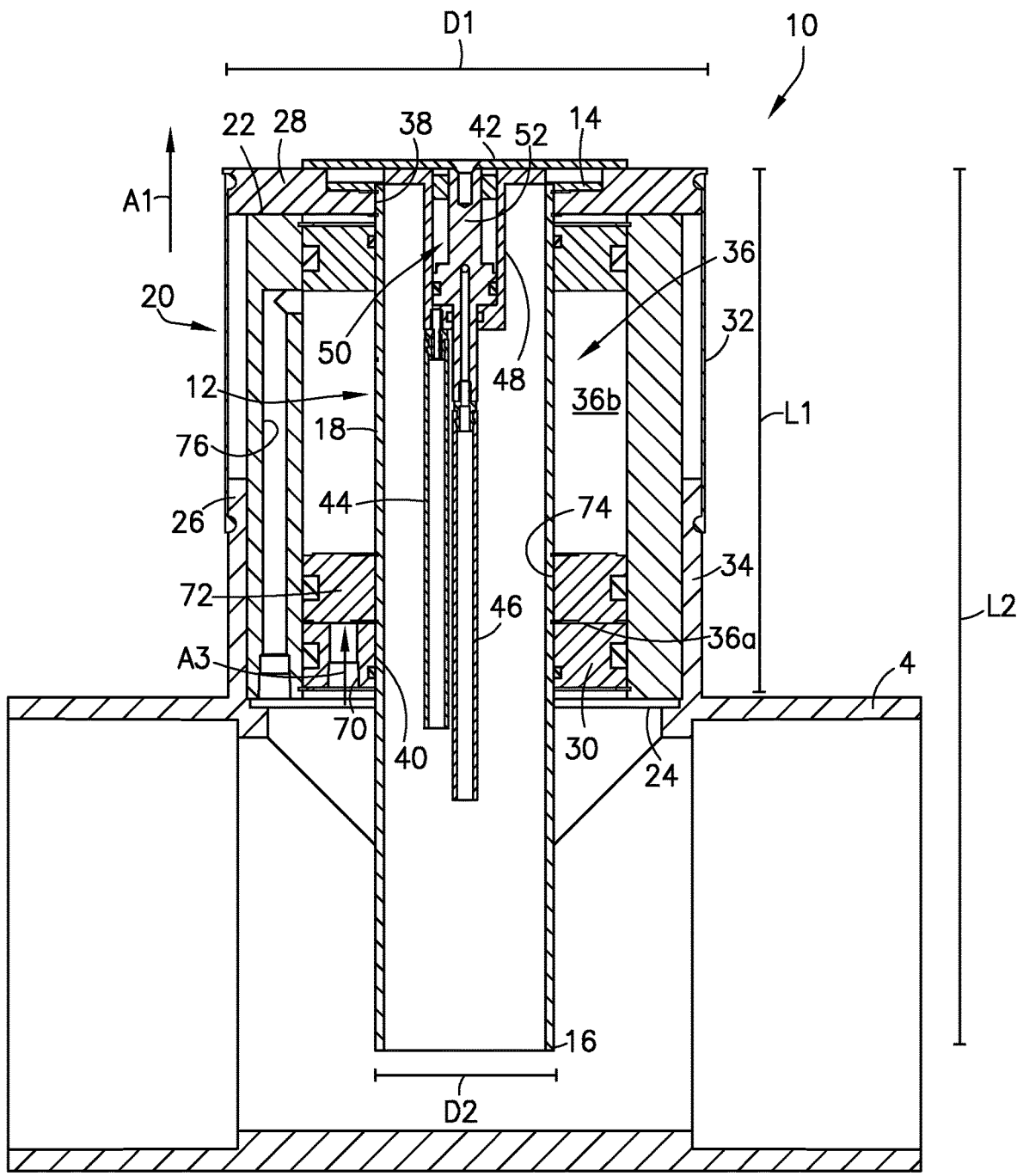
FIG. 2A is a cross-sectional view of an extendable drain in a retracted position, according to some non-limiting embodiments or aspects of the disclosure.
Figure 2B:
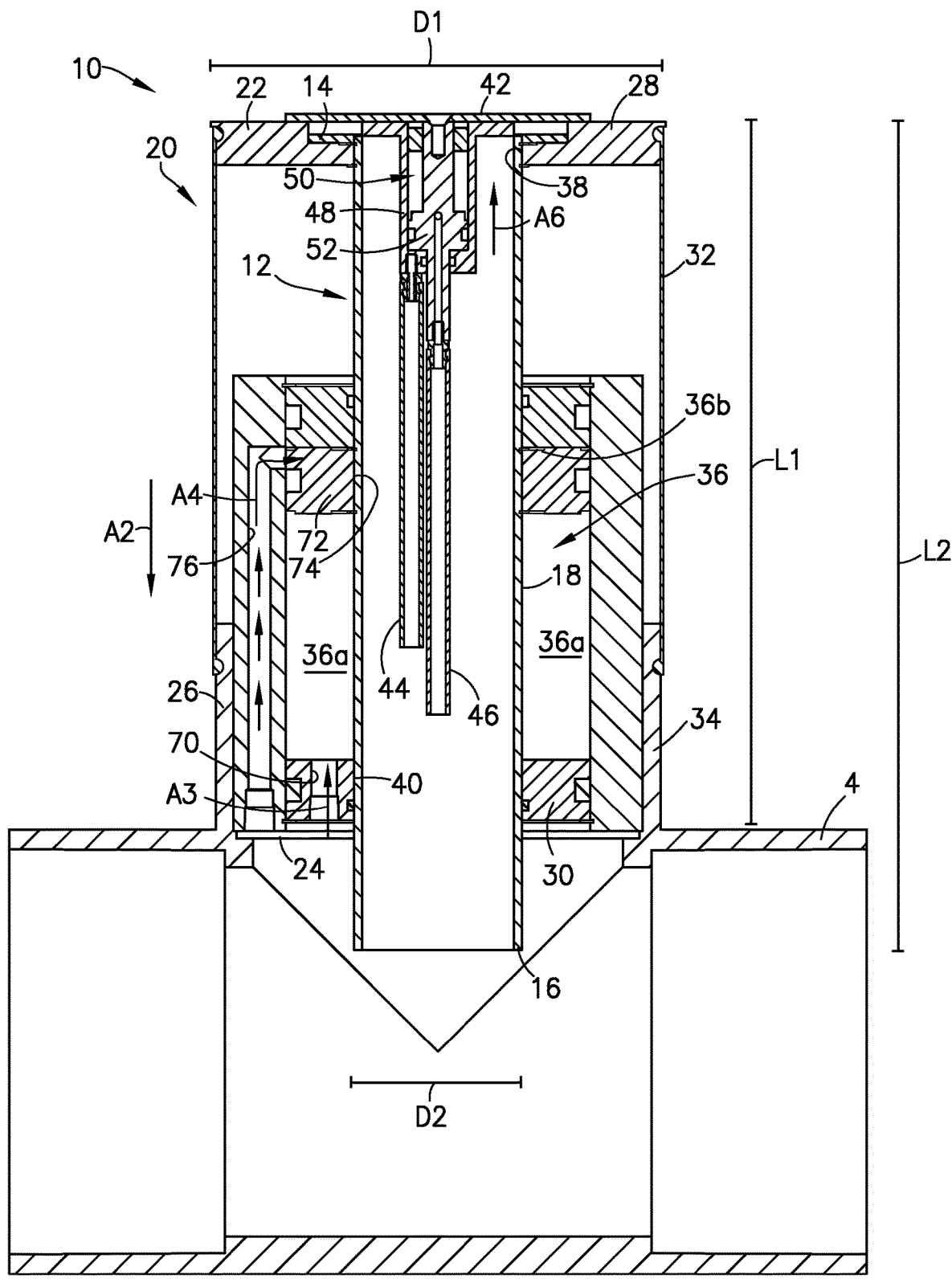
FIG. 2B is a cross-sectional view of the extendable drain of FIG. 2A, with the housing in an extended position.
Figure 2C:
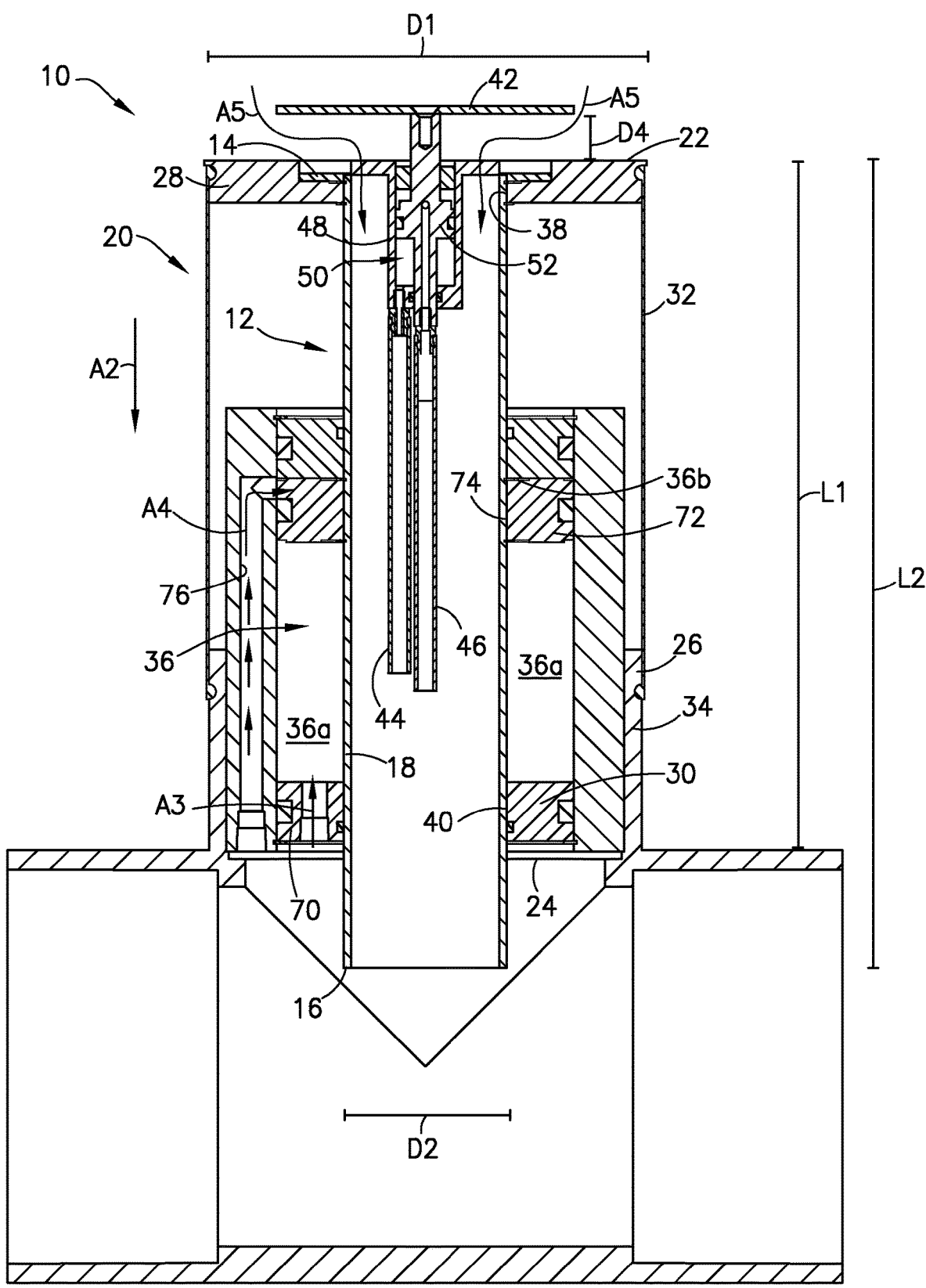
FIG. 2C is cross-sectional view of the extendable drain of FIG. 2A, with the housing and the drain cap in extended positions.

Detailed cross-sectional views of a non-limiting embodiment of an extendable drain 10 are shown in FIGS. 2A-2C. With reference to FIGS. 2A-2C, the drain 10 can include a housing 20 comprising a top 22, a bottom 24, and a sidewall 26 extending between the top 22 and the bottom 24 of the housing 20. The top 22 of the housing 20 can be at least partially enclosed by a top plate 28 or cover. In a similar manner, the bottom 24 of the housing 20 can be at least partially enclosed by a bottom plate 30 or cover. The top plate 28, the bottom plate 30, and portions of the sidewall 26 of the housing 20 can be formed from rigid, corrosion resistant materials, as are known in the art, including hard plastics or non-corrosive metals, such as brass, galvanized steel, or stainless steel. As described in further detail herein, the top plate 28 and/or the bottom plate 30 can include an annular seal about a peripheral edge of the plate 28, 30 for sealing against an inner surface of the sidewall 26 of the housing 20 and/or so that the bottom plate 30 slides more easily through the housing 20 as the drain 10 moves between the retracted position and the extended position.

In some non-limiting embodiments or aspects, the sidewall 26 of the housing 20 includes an annular stretchable sleeve 32. The annular sleeve 32 can be formed from an elastomeric material capable of stretching axially, such as silicone and/or other natural or synthetic elastomeric materials (e.g., neoprene, isoprene, natural rubber, or synthetic rubber). The annular sleeve 32 can have a substantially smooth (e.g., cylindrical) outer surface that is substantially free from protrusions, convolutions, corrugations, ridges, or other surfaces that may inhibit the sleeve 32 from moving through dirt or sand as the drain 10 extends or retracts. In some non-limiting embodiments or aspects, the sidewall 26 of the housing 20 can also include a rigid annular wall portion 34 formed from the rigid corrosion resistant material. For example, as shown in FIGS. 2A-2C, the annular wall portion 34 can form a base portion of the sidewall 26 of the housing 20 and the annular sleeve 32 can form a top portion of the sidewall 26 of the housing 20 mounted, for example, between the top plate 28 or cover of the housing 20 and an edge of the annular wall portion 34. An outer surface of the annular sleeve 32 can be flush with an outer surface of the annular wall portion 34 so that the housing 20 moves easily through the sand or dirt as the drain 10 expands and retracts. As used herein, a first surface is "flush" with a second surface when the first surface and the second surface are co-planar or substantially co-planar (e.g., only differing by a small amount such as about 5%) and when there are no gaps, openings, discontinuities, protrusions, ridges, or similar structures between the first surface and the second surface. For example, the annular sleeve 32 and the annular wall portion 34 can have a same diameter D1 and can be aligned along a same axis, such that the surfaces of the sleeve 32 and the wall portion 34 are flush. While a size of the housing 20 can be determined by those skilled in the art based, for example, on a number of drains 10 installed in a particular bunker 2 and/or on a size of the bunker 2, generally, the diameter D1 can be from about 5.0 inches to about 15.0 inches. The housing 20 can have a length L1, in the retracted position (shown in FIG. 2A), of about 6.0 inches to about 18.0 inches.

As shown in FIGS. 2A-2C, the housing 20 defines an interior volume 36 configured to be at least partially filled by a fluid. As the interior volume 36 is being filled with the fluid, the annular sleeve 32 can be configured to stretch axially, thereby increasing the length L1 or distance between the top 22 of the housing 20 and the bottom 24 of the housing 20. In the expanded position (shown in FIGS. 2B and 2C), the length L1 can be about 8.0 inches to about 24.0 inches. Desirably, the annular sleeve 32 does not extend radially or bulge by any appreciable amount as the interior volume 36 of the housing 20 is being filled. Instead, the annular sleeve 32 desirably forms a substantially uniform surface (e.g., a substantially uniform cylindrical surface in both the retracted position (FIG. 2A) and in the extended position (FIGS. 2B and 2C) along its entire length and circumference) so that the housing 20 moves easily through sand or dirt as the drain 10 moves between the retracted position and the extended position.

The extendable drain 10 also includes a drain tube or drain member 12 having an open inflow portion or top 14 fixed to the top of the housing 20, an open outflow portion or bottom 16, and a sidewall 18 extending between the top 14 and the bottom 16 of the drain member 12 through the interior volume 36 of the housing 20. The extendable drain 10 can be configured such that at least partially filling the interior volume 36 of the housing 20 moves the drain member 12 axially causing the sleeve 32 to stretch. The drain member 12 is generally at least long enough to extend from the top 22 of the housing 20 through the interior volume 36 of the housing 20 into the drain conduit 4, even when the housing 20 is fully extended (as shown in FIGS. 2B and 2C). In some non-limiting embodiments or aspects, the drain member 12 can have a length L2 of from about 12.0 inches to about 30.0 inches and a diameter D2 of from about 2.0 inches to about 6.0 inches. The drain member 12 can be formed from any rigid material commonly used for water conduits and other plumbing fixtures including, for example, a corrosion resistant metal (e.g., copper, brass, or stainless steel) or plastic (e.g., segments of PVC pipe). As shown in FIGS. 2A-2C, the drain member 12 has a circular cross section. In other non-limiting embodiments or aspects, the drain member 12 can have a cross section that is oval, semi-circular, square, rectangular, or any other regular or irregular shape.

In some non-limiting embodiments or aspects, the housing 20 fully encloses the sidewall 18 of the drain member 12. As described herein, the sidewall 18 of the drain member 12 is "fully enclosed" when the sidewall 18 of the drain member 12 is spaced apart from any sand or dirt surrounding the extendable drain 10, such that any sand or dirt contacts the sidewall 26 of the housing 20 and does not contact the sidewall 18 of the drain tube or drain member 12 or collect in the interior volume 36 of the extendable drain 10.

As previously described, in some non-limiting embodiments or aspects, the housing 20 comprises the top plate 28 or cover that is fixedly connected to the open top 22 of the housing 20. The top plate 28 can be an annular plate defining an opening 38. The top 14 of the drain member 12 is fixed to the annular top plate 28 and aligned to the opening 38 of the annular plate 28 meaning that water passes through the opening 38 of the annular plate 28 and directly into a flow channel defined by the sidewall 18 of the drain member 12. In a similar manner, the bottom plate 30 or cover can be an annular plate defining an opening 40. The drain member 12 can be positioned through the opening 40 of the bottom annular plate 30 and configured to slide through the opening 40 as the drain 10 moves between the retracted position and the extended position. In some non-limiting embodiments or aspects, the bottom 24 of the housing 20 is mounted to a sidewall of the drain conduit 4 or drainpipe, such that water flows through the drain member 12, through the open bottom 16 of the drain member 12, and into the drain conduit 4. In some non-limiting embodiments or aspects, vertical sections of pipe 60 (shown in FIG. 3) can be installed extending between the drain 10 and the drain conduit 4 if, for example, the drain conduit 4 is buried too deep to attach directly to the drain 10.

In some non-limiting embodiments or aspects, the housing 20 can be integrated with and/or configured to function as a linear actuator, meaning a device that causes the housing 20 to extend, retract, and/or move in a desired direction. More specifically, an "actuator" can refer to a mechanical or electro-mechanical device that transitions between an operational or active state and a non-active state. In the active state, the actuator exerts a linearly-directed or axial biasing force on an object, such as on the housing 20 or drain member 12, which causes the housing 20 or drain member 12 to move in a distal direction, as shown by arrow A1 in FIG. 2A. When the actuator is in the non-active state, the distally directed force is removed or is counteracted by a proximally directed biasing force causing the housing 20 and drain member 12 to retract and/or move in a proximal direction, as shown by arrow A2 in FIGS. 2B and 2C.

In some non-limiting embodiments or aspects, the housing 20 is extended and retracted by filling portions of the interior volume 36 of the housing 20 with a fluid. In order to introduce the fluid into the interior volume 36 defined by the housing 20, the housing 20 can include an inflow port 70. Fluid passes into the interior volume 36 of the housing 20 through the inflow port 70 as shown by arrows A3. As shown in FIGS. 2A-2C, the inflow port 70 passes through the bottom plate 30 of the housing 20. In other preferred and non-limiting embodiments, the inflow port 70 could also pass through a portion of the sidewall 26 and/or top plate 28 of the housing 20 in order to introduce the fluid to the interior volume 36 of the housing 20. While not shown in FIGS. 2A-2C, the inflow port 70 is configured to be connected to a fluid supply line, such that fluid passes from a fluid source, through the fluid supply line, through the inflow port 70, and into the interior volume 36 defined by the housing 20. As described in further detail herein, in some non-limiting embodiments or aspects, the fluid source is a source of pressurized water, such as water provided from a golf course sprinkler or irrigation system. In other non-limiting embodiments or aspects, the fluid can be compressed air, hydraulic fluid, or any other convenient compressible or non-compressible fluid as are known in the art. For example, a source of compressed air could be buried below the bunker 2 proximate to the drain 10 and could provide compressed air to extend and retract the drain if, for example, a sprinkler or irrigation system is not available to provide pressurized water to the drain 10.

In some non-limiting embodiments or aspects, in order to facilitate movement of the drain 10 from the retracted position to the extended position, the drain 10 further includes a piston 72 fixedly connected to an outer surface of the sidewall 18 of the drain member 12 and positioned in the interior volume 36 defined by the housing 20. For example, the piston 72 can define an opening 74 having a shape and/or diameter corresponding to a shape and/or diameter of the outer surface of the drain tube or drain member 12. The piston 72 can also include a peripheral edge configured to seal against an inner surface of the sidewall 26 of the housing 20. The piston 72 can be an annular plate similar in size and shape to the previously described top plate 28 and bottom plate 30.

The piston 72 can separate the interior volume 36 of the housing 20 into a lower or first volume 36a and an upper or second volume 36b. When the piston 72 is present, at least partially filling the lower or first volume 36a with the fluid through the inflow port 70 causes the piston 72 to move in an upwards or first direction as shown by arrow A1 (in FIG. 2A). Since the piston 72 is fixed to the outer surface of the drain member 12, movement of the piston 72 in the upwards or first direction causes the drain 10 to move toward the extended position.

In some non-limiting embodiments or aspects, when fluid is not being pumped into the interior volume 36 of the housing 20, the housing 20 and drain member 12 may automatically return to the retracted position. For example, the sleeve 32 may be biased to the retracted position such that when fluid pressure ceases, the sleeve 32 begins to retract, causing the drain 10 to return to the retracted position. In other non-limiting embodiments or aspects, the drain 10 can include a resilient member, such as a helical coil or spring, operatively connected to the drain member 12 and/or housing 20, that returns the drain member 12 and/or housing 20 to the retracted position when fluid pressure from fluid entering the interior volume 36 through the inflow port 70 ceases. Alternatively, the drain member 12 and housing 20 may remain in an extended position when the actuator is in the non-active state (i.e., when fluid is no longer being pumped into the interior volume), at least until some external force pushes the drain member 12 and/or housing 20 back to a retracted position. For example, a user (e.g., a golf course maintenance worker) may manually push the drain member 12 and/or housing 20 back to the retracted position after all water has drained from the bunker 2. In other non-limiting embodiments or aspects, the housing 20 or actuator may be double-acting (e.g., capable of exerting a biasing force in both the proximal and distal directions), such that once water is drained from the bunker 2, the housing 20 exerts a proximally directed biasing force on the drain member 12 causing the drain member 12 and/or housing 20 to return to the retracted position.

For example, in order to actively force the drain 10 back to the retracted position, the drain 10 can include a second inflow port 76 for filling the second volume 36b with fluid from the fluid source. The second inflow port 76 can be a fluid channel passing through the sidewall 26 of the housing 20 and including an opening to the second volume 76 near the top 22 of the housing 20. While not shown in FIGS. 2A-2C, a proximal end of the second inflow port 76 can be connected to the fluid source through a fluid supply line to supply the fluid to the second volume 36b of the housing 20. For example, as shown by arrows A4 (in FIGS. 2B and 2C), the fluid can pass through the second inflow port 76 into the second volume 36b at a position above the piston 72. As the second volume 36b fills with the fluid, the piston 72 moves in a proximal or second (e.g., downward) direction causing the drain 10 to move from the extended position towards the retracted position. Further, at least partially filling the second volume 36b can cause fluid contained in the first volume 36a to pass back through the first inflow port 70, thereby allowing the drain 10 to retract.

In some non-limiting embodiments or aspects, the drain 10 further includes a cap 42 movable between a retracted position (shown in FIGS. 2A and 2B), in which the cap 42 covers the open top 22 of the drain member 12, and an extended position (shown in FIG. 2C) in which the cap 42 is separated from the open top 22 of the drain member 12 so that water flows past the cap 42 into the drain member 12, as shown by arrows A5 (in FIG. 2C). The cap 42 can be a substantially flat structure, such as a disk, sized to fit over and seal the open top 14 of the drain member 12. For example, the cap 42 can have a diameter D3 of about 3.5 inches to about 10.0 inches. In general, the cap 42 includes a flat surface without protrusions, raised portions, ridges, gaps, openings, or other discontinuities, so that the drain 10 can be easily pushed through the sand or dirt of the bunker 2 as the drain 10 extends and retracts. As previously described, complex structures, such as protrusions or ridges, can be difficult to move through the sand or dirt. Further, abrasive materials, such as sand, silt, or dirt, can become trapped in openings or gaps, damaging the drain 10. Accordingly, devices with flat and smooth surfaces are believed to have a longer operational life compared to devices including irregular, bulging, or protruding surfaces or structures.

The cap 42 can be connected to and/or integrated with a linear actuator or drive member configured to move the cap 42 between the retracted position and the extended position. For example, the actuator can include a cap housing 48 mounted, for example, to the top plate 28 of the drain housing 20. The cap housing 48 can enclose a volume 50 and a cap piston 52 configured to move through the cap housing 48 to extend or retract the cap 42. The actuator can further include a first inflow channel 44 or port that provides fluid into the interior volume 50 to push the cap piston 52 through the housing 48 in an upward direction, thereby causing the cap 42 to move to the extended position. The actuator can further include a second inflow channel 46 or port for providing fluid to the interior volume 50 of the cap housing 48 above the piston 52, which forces the piston 52 in a downward direction to retract the cap 42. While not shown in FIGS. 2A-2C, proximal ends of the first inflow channel 44 and/or the second inflow channel 46 can be connected to the fluid source by fluid supply lines for providing the fluid to the inflow channels 44, 46 or ports. The fluid supply lines can include one or more manually or automatically actuated valves that open or close to control movement of the cap 42 between the retracted position and the extended position.

The cap actuator can be activated in the same manner as the actuator that extends and retracts the drain housing 20. For example, the drain cap actuator can be sensitive to water pressure or moisture. When either an increase in pressure or moisture is detected, the drain cap actuator can automatically activate valves in the fluid supply lines causing fluid to enter the interior volume 50 of the cap housing 48 through the first channel 44 or the second channel 46. In other non-limiting embodiments or aspects, the drain cap actuator can be configured to activate in conjunction with movement of the housing 20 and drain member 12. For example, the drain cap 42 can be configured to move to the extended position when movement of the drain member 12 and/or housing 20 is detected or, preferably, immediately after movement of the drain member 12 and/or housing 20 is completed, indicating that the drain 10 is in the extended position. Similarly, the drain cap 42 can be configured to automatically retract when the drain member 12 is retracted (e.g., moves in a proximal direction, shown by arrow A2 in FIGS. 2B and 2C) and/or when the fluid begins to flow through the first inflow port 70 at the bottom 24 of the housing 20.

In use, after the drain 10 is moved to the extended position with the top 22 of the housing 20 above a surface of the sand (as shown in FIG. 2B), fluid is pushed through the first inflow channel 44 into the interior volume 50 of the cap housing 48. The fluid contacts the piston 52 causing the piston 52 to move in an upward direction (shown by arrow A6) to move the cap 42 to the extended position (shown in FIG. 2C). When extended, the drain cap 42 can be spaced apart from the top 22 of the housing 20 by a distance D4 (shown in FIG. 2C). The distance D4 can be from about 1.0 inch to about 4.0 inches. After water is drained from the bunker and the drain 10 is ready to move to the retracted position, fluid is pumped through the second inflow channel 46 collecting above the piston 52, which presses the piston 52 in a downward direction causing the cap 42 to return to the retracted position (shown in FIGS. 2A and 2C).

With continued reference to FIGS. 2A-2C, the drain 10 may be extended and retracted as follows. Initially, the drain 10 is in a retracted position (as shown in FIGS. 1A and 2A), where the housing 20 is retracted meaning that the annular sleeve 32 is in a substantially relaxed or un-stretched state. Also, the drain cap 42 is retracted and any biasing member, such as a spring (if present), is in an unbiased position. In this position, the bunker 2 is substantially dry and the open top 14 of the drain member 12 and drain cap 42 are buried an acceptable depth below the surface 9 of the sand 8. As water collects in the bunker 2, the drain 10 can be manually or automatically activated. For example, a user (golf course maintenance worker) may cause a valve in a fluid supply line of a water irrigation or sprinkler system to open, causing water to flow into the interior volume 36 of the housing 20 through the first inflow port 70. In other non-limiting embodiments or aspects, a valve may be automatically opened or an inflating device (e.g., a device that provides compressed gas to the interior volume 36 of the housing 20) may be automatically activated causing fluid to pass into the interior volume 36 defined by the housing 20 to at least partially fill the interior volume 36. The housing 20 is shown in a filled or extended position in FIG. 2B. In this filled or extended position, the top 22 of the housing 20 and the top 14 of the drain tube or drain member 12 extend above the surface 9 of the sand 8. The extended annular sleeve 32 of the housing 20 may exert a biasing force in a proximal direction against the housing 20. In FIG. 2B, the drain cap 42 remains in the retracted position.

After the housing 20 is at least partially filled, thereby moving the drain cap 42 above the surface 9 of the sand 8, the drain cap 42 can be extended by, for example, causing fluid to flow into the cap housing 48 through the first inflow channel 44, which pushes the cap 42 to the extended position, as shown in FIG. 2C. Once the drain cap 42 is extended, water can flow into the drain tube or drain member 12 through the open inflow portion or top 14 of the drain member 12. The water flows through the drain tube or drain member 12, out of the open bottom of the drain member into the drainpipe or drain conduit 4, and away from the drain 10 and bunker 2. Once the water collected in the bunker 2 has drained, the drain cap 42 can be retracted by, for example, causing fluid to pass into the interior volume 50 of the cap housing 48 through the second inflow channel 46 to push the drain cap 42 to its retracted position (shown in FIG. 2B). Once the drain cap 42 returns to the retracted position, the drain housing 20 can be made to return to its retracted position. For example, as previously described, fluid can be introduced into the second volume 36b defined by the housing 20, which causes the piston 72 to retract through the housing 20 towards the bottom 24 of the housing 20. Movement of the piston 72 towards the bottom 24 of the housing 20 causes the annular sleeve 32 to retract or return to its un-stretched state. As previously described, a biasing force on the sleeve 32 may assist in causing the sleeve 32 to return to the retracted position or un-stretched position, thereby allowing the drain 10 to return to the retracted position (shown in FIG. 2A). In other non-limiting embodiments or aspects, the drain 10 can include the resilient member, such as the spring, that provides an additional retracting force on the housing 20 or drain member 12.

Drainage Systems

Figure 3:
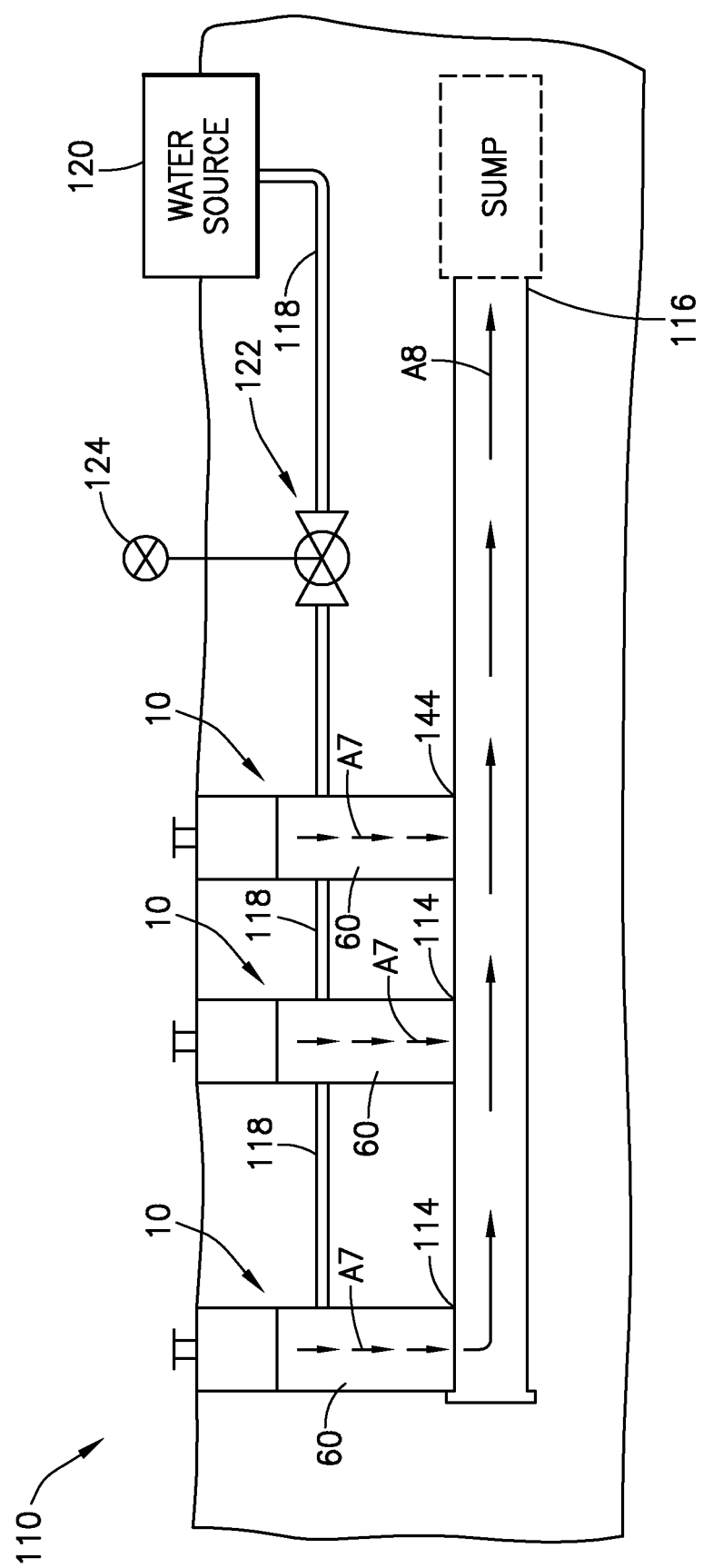
FIG. 3 is a schematic drawing of a drainage system for a bunker, according to some non-limiting embodiments or aspects of the disclosure.
Figure 4:
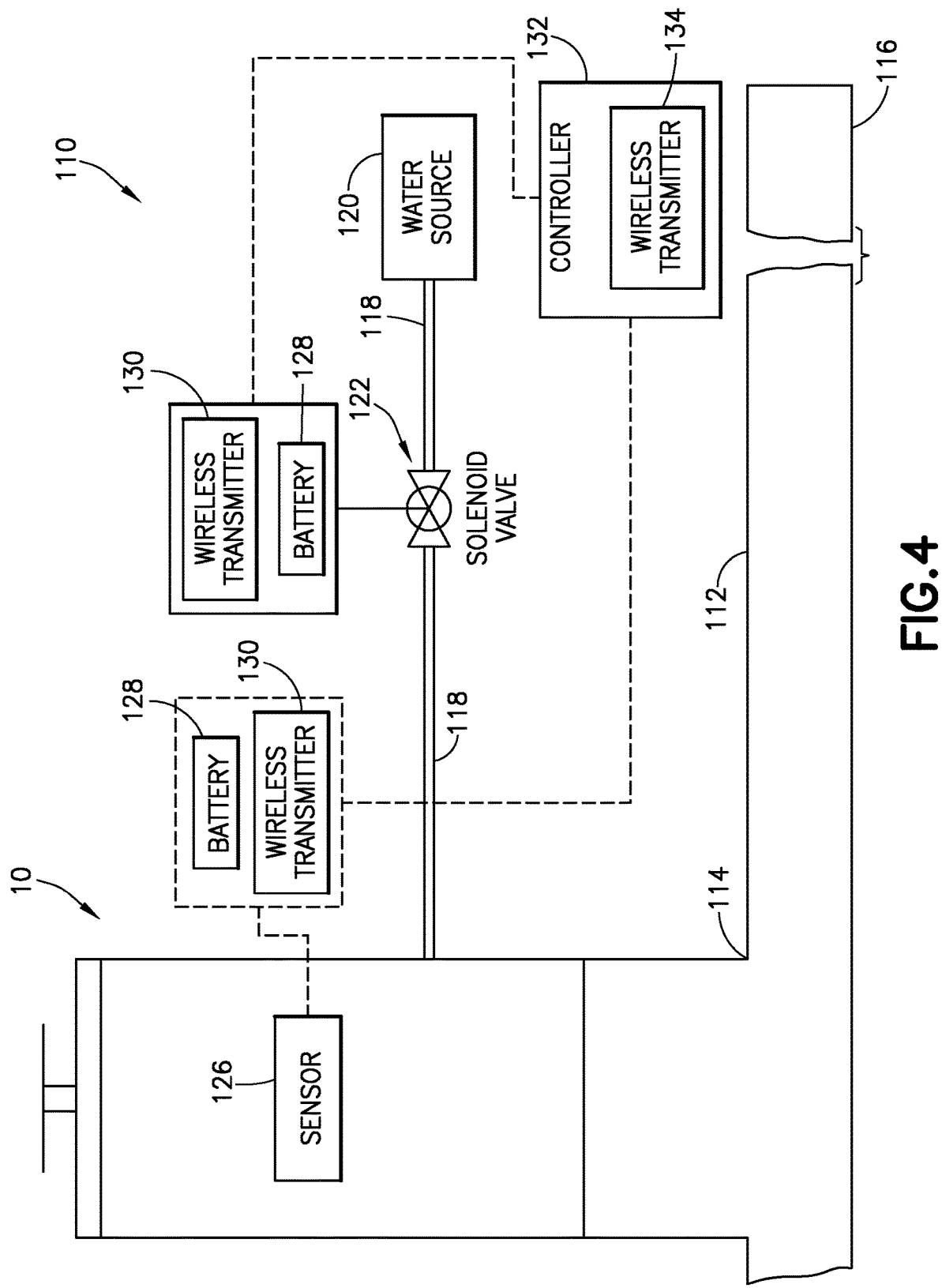
FIG. 4 is a schematic drawing of electrical components of a drainage system for a bunker, according to some non-limiting embodiments or aspects of the disclosure.
Figure 5A:
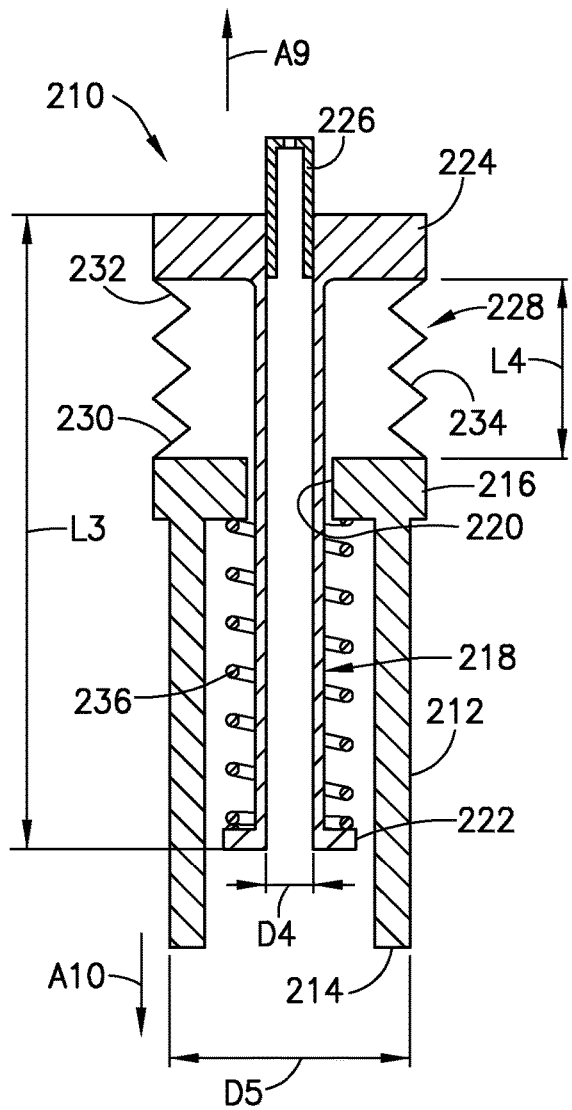
FIG. 5A is a schematic drawing of a cross-sectional view of an extendable sprinkler in a retracted position, according to some non-limiting embodiments or aspects of the disclosure.

With reference to FIGS. 3 and 4, drainage systems 110 for a golf course bunker or for any other pit, depression, or low-lying area includes a plurality of any of the exemplary extendable drains 10 described herein. As previously described, the extendable drains 10 include the drain tube or drain member 12 including the inflow portion or top 14 and the outflow portion or bottom 16; the housing 20 that encloses the drain tube or drain member 12; and the inflow ports 70, 76 for introducing fluid into the interior volume 36 of the housing 20 to move the drains 10 between the retracted positions and the extended positions. The drainage system 110 can further include an arrangement of conduits 112 including inflow portions 114 connected, for example, to vertical drain conduits 60 and an outflow portion(s) 116 opposite the inflow portions 114. The outflow portion(s) 116 can be configured to expel water to, for example, a sump, storm drain, golf course water feature (e.g., a pond or stream), or to any other convenient location. As shown in FIG. 3, the arrangement of conduits 112 can include a single substantially horizontal segment connected to multiple drains 10 for transporting the water collected through the drains 10 away from the bunker 2 towards the outflow portion 116 of the arrangement of conduits 112. In other non-limiting embodiments or aspects, the system 110 can include multiple segments connected to different drains 10. Each of the multiple segments may extend to a common outflow location. In either case, water in the bunker flows, as shown by arrows A7, through the drains 10 and vertical drain conduits 60 to the horizontal conduits 112. Water then flows through the horizontal conduits 112, as shown by arrow A8, to the outflow portion 116.

In some non-limiting embodiments or aspects, the drainage system 110 further includes an arrangement of water supply conduits 118 extending from a water source 120 to the drains 10 for delivering water to the drain 10. The system 110 may further include valve(s) 122 positioned along the water supply conduits 118 or, for example, between the water supply conduits 118 and the drains 10 for controlling the flow of water to the interior volumes 36 of the housings 20. When the valve(s) 122 are in an open position, water flows from the water source 120, through the water supply conduits 118, and into the housings 20. As discussed previously, as the housings 20 are at least partially filled by fluid, the housings 20 and drain members 12 move to their extended positions. When the valve(s) 122 are in a closed position, water flow to the housings 20 stops, causing the annular sleeve 32 to retract, which allows the drain member 12 and housing 20 to return to their retracted positions. With specific reference to FIG. 3, in some non-limiting embodiments or aspects, the valve(s) 122 are manually operated. For example, the valve(s) 122 can be connected to a knob, dial, handle, or lever 124 that can be twisted or otherwise engaged by a user (e.g., golf course maintenance crew) to open or close the valves 122 to control water flow. In other non-limiting embodiments or aspects, the valves 122 can be electro-mechanical valves, such as electrically powered solenoid valves, that can be actuated (e.g., opened or closed) by, for example, a remote control device, such as a computer or smart phone.

With specific reference to FIG. 4, in some non-limiting embodiments or aspects, the drainage system 110 is an automated electronic activation system configured to automatically move the drains 10 between the retracted and extended positions. The automated drainage system 110 includes one or more sensors 126 configured to detect information indicating that water is collecting in the bunker 2. For example, the sensor 126 can be a water pressure sensor configured to detect increased pressure indicating that water is collecting in the bunker 2. In other non-limiting embodiments or aspects, the sensor 126 can be a moisture sensor configured to detect moisture or water in proximity to the sensor 126. In other non-limiting embodiments or aspects, the sensor 126 can be an optical or light (e.g., radiance) sensor that detects changes in light intensity caused when water collects in the bunker 2. The sensor 126 can be positioned on one of the drains 10, as shown in FIG. 4, or at any other convenient location in proximity to the drains 10 and bunker 2. In some non-limiting embodiments or aspects, the sensors 126 are independent electronic devices configured to collect and process data. In some non-limiting embodiments or aspects, the sensors 126 can include a power source, such as a battery 128 for providing power for the sensor 126. The sensors 126 can further include a wireless data transmitter 130 for transmitting collected data to remote devices.

The sensors 126 are electrically connected to and/or in electronic communication with a controller 132, such as a computer processor. For example, the controller 132 may include a wireless transmitter 134 that receives information from the sensors 126 and transmits instructions to other devices. In some non-limiting embodiments or aspects, the controller 132 may also be electrically connected to the valve(s) 122, such as solenoid valves, located by the drains 10, along the water supply conduits 118, or at the water source 120. As in previous embodiments or aspects, the solenoid valve(s) 122 are configured to open to allow water to flow from the water source 120 to the drains 10. The solenoid valve 122 can include or be connected to a wireless transmitter 134 for receiving instructions from the controller 132 and a battery 128 for providing power for the transmitter 134 and for electro-mechanical devices for opening and closing the valve 122.

In some non-limiting embodiments or aspects, the controller 132 is configured to receive and process signals from the sensors 126. For example, received signals can be processed to determine ambient pressure (e.g., water or air pressure) in proximity to the sensors 126. In other non-limiting embodiments or aspects, the signals can be processed to determine whether moisture is present in proximity to the sensors 126 or to determine light (radiance) in proximity to the sensors 126. Processing the received signals can also include analyzing the detected pressure, moisture, and/or optical information to determine whether water is collecting in the bunker 2. The controller 132 is further configured to cause the extendable drains 10 to move to the extended position when the received and processed signals from the sensors 126 indicate that water is collecting in the bunker 2. In some non-limiting embodiments or aspects, as previously discussed, the controller 132 activates or causes the solenoid valves 122 to move to the open position, which allows water to flow into the interior volume 36 of the housing 20 of the drains 10. In other non-limiting embodiments or aspects, the controller 132 may be configured to cause an electrical component of the actuator to turn on or, for example, can cause air to flow into the housings 20 of the drains 10 from an associated bellows or reservoir (e.g., a compressed air canister).

Extendable Sprinklers

Figure 5B:
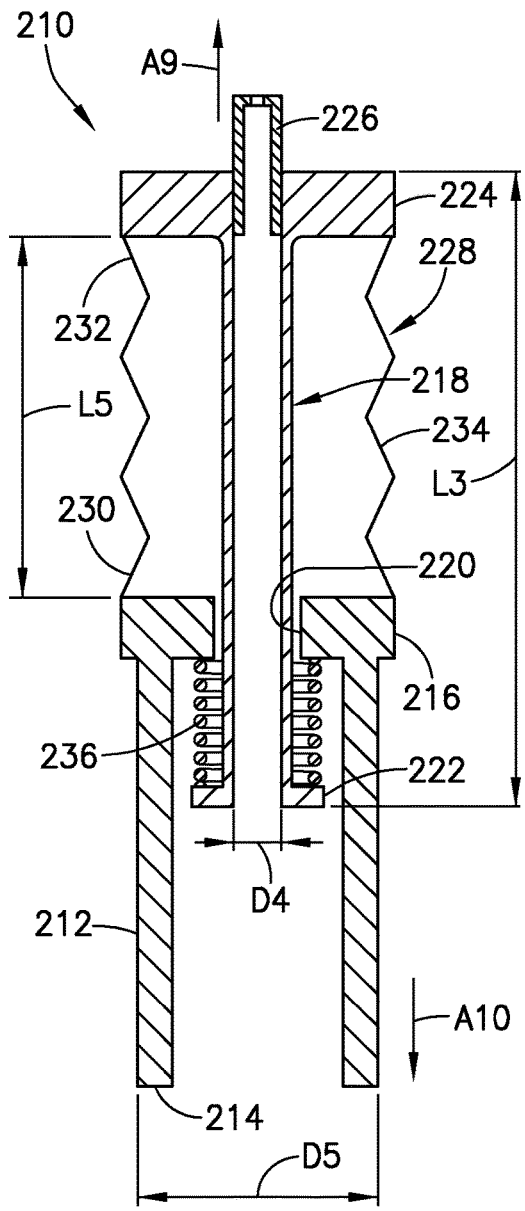
FIG. 5B is a schematic drawing of a cross-sectional view of the extendable sprinkler of FIG. 5A in an extended position.
Figure 6:
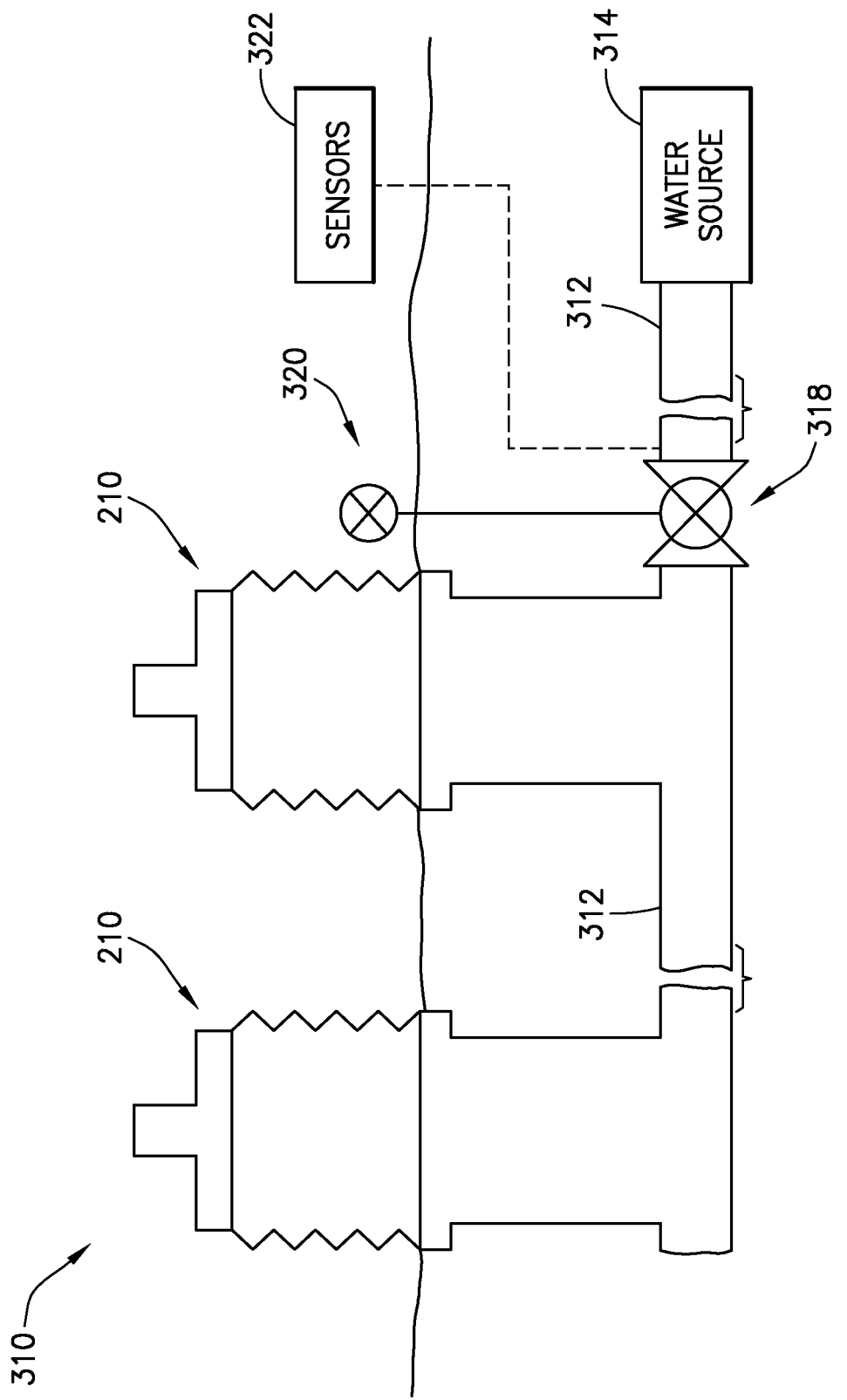
FIG. 6 is a schematic drawing of a sprinkler system, according to some non-limiting embodiments or aspects of the disclosure.

With reference to FIGS. 5A-6, an extendable sprinkler 210 is shown that transitions from a retracted position (shown in FIG. 5A), when not in use, to an extended position (shown in FIG. 5B), when water is being expelled from the sprinkler 210. When the sprinkler 210 is in the retracted position, all or nearly all portions of the sprinkler 210 are below ground level, meaning that it does not interfere with and cannot be damaged by lawnmowers or other vehicles and does not present a tripping hazard for, for example, golf course users.

As shown in FIGS. 5A and 5B, the extendable sprinkler 210 includes a support conduit 212 including an inflow portion 214 configured to be connected to a water supply conduit (not shown in FIGS. 5A and 5B) and an opposing outflow portion 216. The support conduit 212 is configured to be at least partially buried below ground, such that the outflow portion 216 is at or slightly above ground level. The support conduit 212 is a sufficient length to extend from the water supply conduit (not shown in FIGS. 5A and 5B) to ground level and can have a diameter D5 of from about 0.25 inch to about 1.5 inches. The support conduit 212 can be formed from any materials commonly used for plumbing pipes and fixtures, such as metal or plastic (e.g., PVC).

The sprinkler 210 further includes a riser conduit 218 extending through an opening 220 of the outflow portion 216 of the support conduit 212. The riser conduit 218 can have a diameter D4, which is narrower than the support conduit 212, so that the riser conduit 218 can be positioned in and at least partially enclosed by the support conduit 212. Further, the riser conduit 218 is sized and configured to slide through the opening 220 of the support conduit 212. A length L3 of the riser conduit 218 is dependent upon the length of the support conduit 212 and an intended extension height of the sprinkler 210 (e.g., the height that the sprinkler 210 extends above the ground when in the extended position). In some non-limiting embodiments or aspects, the length L3 of the riser conduit 218 can be from about 3.0 inches to about 12 inches, and the diameter D4 of the riser conduit 218 can be from about 0.25 inch to about 1.0 inch. The riser conduit 218 can include a proximal flange 222 on the proximal end of the riser conduit 218, a distal flange 224 on the distal end of the conduit 218, and a sidewall extending between the flanges 222, 224.

The sprinkler 210 can further include a sprinkler nozzle 226 connected to the riser conduit 218 configured to expel water that passes through the support conduit 212 and the riser conduit 218 to the sprinkler nozzle 226. In some non-limiting embodiments or aspects, the nozzle 226 can be a perforated cover or disk extending over an open distal portion of the riser conduit 218. In other non-limiting embodiments or aspects, the open distal portion of the riser conduit 218 includes, for example, a threaded portion configured to engage with corresponding threads of a sprinkler nozzle 226 or sprinkler head for attaching the sprinkler nozzle 226 or sprinkler head to the riser conduit 218.

As shown in FIGS. 5A and 5B, the extendable sprinkler 210 further includes an annular inflatable bladder 228 including a proximal portion 230 connected to the support conduit 212, a distal portion 232 connected to the riser conduit 218 or sprinkler nozzle 226, and a sidewall 234 extending between the proximal portion 230 and the distal portion 232. For example, the proximal portion 230 of the inflatable bladder 228 can be connected to the outflow portion 216 of the support conduit 212. The distal portion 232 of the inflatable bladder 228 can be connected to a peripheral edge of the distal flange 224 of the riser conduit 218.

The inflatable bladder 228 is positioned to surround the outflow portion 216 of the support conduit 212 and portions of the riser conduit 218. Particularly, the inflatable bladder 228 is configured to enclose the opening 220 on the distal end of the support conduit 212 to prevent water, debris, and other materials from passing into the interior of the sprinkler 210 and into the support conduit 212, which may contaminate and clog portions of the sprinkler 210, restrict water flow through the sprinkler 210, and/or prevent the sprinkler 210 from extending and retracting as intended. The inflatable bladder 228 extends axially causing the riser conduit 218 to move from the retracted position (shown in FIG. 5A) to the extended position (shown in FIG. 5B) under force of water flowing through the support conduit 212 and the riser conduit 218. For example, the inflatable bladder 228 may have a length L4 in the retracted position (FIG. 5A) and a length L5 when extended (FIG. 5B). The inflatable bladder 228 can be similar in shape and construction to elastomeric sleeves described previously. For example, the inflatable bladder 228 can be formed from flexible and/or stretchable elastomeric materials, such as silicone and/or natural or synthetic rubbers.

In use, water flowing into the extendable sprinkler 210 through the support conduit 212 passes into the inflatable bladder 228 through the opening 220, which causes the bladder 228 to inflate and produce pressure on the distal flange 224 to push the riser conduit 218 in the distal direction, shown by arrow A9. In some non-limiting embodiments or aspects, the proximal flange 222 can be sized so that some of the water flowing through the support conduit 212 contacts the proximal flange 222, which provides an additional force for pushing the riser conduit 218 in the distal direction, shown by arrow A10.

In some non-limiting embodiments or aspects, the sprinkler 210 further includes a resilient member, such as a helical spring 236, mounted between the riser conduit 218 and the support conduit 212. The helical spring 236 is shown in an extended or unbiased state in FIG. 5A and in a compressed or biased state in FIG. 5B. In the compressed state, the helical spring 236 exerts a biasing force in a proximal direction (shown by arrow A10 in FIG. 5B) on the riser conduit 218 to retract the riser conduit 218. In use, when water is turned off, the bladder 228 begins to deflate. As the bladder 228 deflates, since there is no longer a distally directed force on the riser conduit 218, the force of the helical spring 236 causes the riser conduit 218 and sprinkler nozzle 226 attached thereto to return to the retracted position (shown in FIG. 5A).

Irrigation or Sprinkler Systems

With reference to FIG. 6, any of the exemplary extendable sprinklers 210 of the present disclosure can be integrated in an irrigation or sprinkler system 310, such as an irrigation or sprinkler system for a golf course, garden, lawn, or other outdoor landscape environment. As discussed previously, using extendable and retractable sprinklers 210 can prevent lawnmowers and other vehicles from damaging the sprinklers 210. In some non-limiting embodiments or aspects, the sprinkler system 310 includes the extendable sprinklers 210. The extendable sprinklers 210 can include the support conduit 212, which is completely or substantially completely buried in the ground, and the riser conduit 218 configured to be retracted in the support conduit 212 when not in use and to extend from the open distal end 220 of the support conduit 212 when water is supplied to the sprinkler 210. The sprinklers 210 further include the nozzle 226 connected to or integrally formed with the riser conduit 218. The sprinklers 210 further include the annular inflatable bladder 228 enclosing portions of the support conduit 212 and riser conduit 218.

In some non-limiting embodiments or aspects, the sprinkler system 310 further includes an arrangement of water supply conduits 312 extending from a water source 314 to the sprinklers 210. For example, outflow portions of the water supply conduit 312 can be connected to the support conduits 212 of the sprinklers 210. As discussed previously, water flows through the support conduits 212 into the inflatable bladder 228 and forces the riser conduits 218 to move to the extended positions. Water is then expelled from the riser conduits 218 through the sprinkler nozzles 226. The riser conduits 218 return to the retracted position, due to the proximally directed force of the helical spring 236, when water is not flowing into the support conduits 212.

The system 310 can further include a valve 318 for controlling movement of water from the water source 314 through the water supply conduits 312. As in previous non-limiting embodiments or aspects, the valve 318 can be a manually actuated valve, such as a tap or sillcock, which is controlled by a handle, knob, or lever 320. In other non-limiting embodiments or aspects, the valve 318 can be an electromechanical device, such as a solenoid valve 318, which can be remotely controlled by, for example, a wireless remote control device operated by a user. In other non-limiting embodiments or aspects, the solenoid valve 318 can be in electronic (e.g., wired or wireless) communication with a control system or controller configured to provide instructions causing the solenoid valve 318 to open and close. For example, the controller can be configured to cause the solenoid valve 318 to open at preselected times and for preselected durations according to a predetermined schedule. In other non-limiting embodiments or aspects, the system 310 can include sensors 322 for detecting information for determining when the valve 318 should be opened. For examples, the sensors 322 may be configured to detect light intensity (radiance) or temperature so that the water turns on at night (e.g., in low light) or at cooler times of the day (e.g., determined based on temperature measurements).

In some non-limiting embodiments or aspects, the drainage system 110 and sprinkler system 310 may be connected together and/or may share any of the mechanical and electrical components described herein. For example, a combined system may be constructed where an arrangement of water supply conduits 118, 312 transports water to drains 10 and sprinklers 210. The combined system could include a series of valves 122, 318 for controlling flow of water from the water source 120, 314 to the drains 10 and sprinklers 210, so that the drains 10 and sprinklers 210 are extended and in use at appropriate times. In particular, the valves 122, 318 of the combined system may be manually controlled by the same remote control device or automatically controlled based on instructions from a common controller (e.g., a central computer or computer network). The common controller may be configured to cause the drains 10 to extend to drain water from the bunkers when it is raining and/or when water is detected collecting in the bunkers. The common controller may be configured to cause the sprinklers 210 to extend when it is dry and, in particular, during times when the golf course or other landscape environment is not is use (e.g., at night).

Although the disclosure has been described in detail for the purpose of illustration based on what is currently considered to be the most practical and preferred embodiments, it is to be understood that such detail is solely for that purpose and that this disclosure is not limited to the disclosed embodiments, but, on the contrary, is intended to cover modifications and equivalent arrangements. Furthermore, it is to be understood that the present disclosure contemplates that, to the extent possible, one or more features of any embodiment can be combined with one or more features of any other embodiment.

What is claimed is:

1. An extendable drain configured to move between a retracted position and an extended position, the drain comprising:
    a housing comprising a top, a bottom, and a sidewall extending between the top and the bottom of the housing comprising an annular stretchable sleeve, the housing defining an interior volume configured to be at least partially filled by a fluid causing the annular sleeve to stretch axially thereby increasing a distance between the top of the housing and the bottom of the housing; and
    a drain member comprising an open top fixed to the top of the housing, an open bottom, and a sidewall extending between the top and the bottom of the drain member through the interior volume of the housing,
    wherein at least partially filling the interior volume of the housing moves the drain member axially causing the sleeve to stretch, thereby increasing the distance between the top of the housing and the bottom of the housing.

2. The extendable drain of claim 1, wherein the drain is configured for draining water from a bunker, and wherein, in the retracted position, the top of the housing is below a surface of the bunker and in the extended position, at least the top of the housing and the top of the drain member are above the surface of the bunker.

3. The extendable drain of claim 2, wherein the housing fully encloses the sidewall of the drain member, such that sand of the bunker is separated from the sidewall of the drain member as the extendable drain extends and/or retracts, and
    wherein the sidewall of the housing is free from seams or openings, thereby preventing sand from the bunker from entering the interior volume defined by the housing.

4. The extendable drain of claim 1, wherein the sidewall of the housing further comprises an annular rigid body with an edge connected to an edge of the sleeve, such that an outer surface of the annular body is flush to an outer surface of the sleeve.

5. The extendable drain of claim 1, wherein the top of the housing comprises an annular plate defining an opening, and wherein the top of the drain member is fixed to the plate and aligned to the opening of the plate.

6. The extendable drain of claim 1, wherein the bottom of the housing is mounted to a sidewall of a drain conduit and wherein the bottom of the drain member is positioned within the drain conduit, such that water flows through the drain member, through the open bottom of the drain member, and into the drain conduit.

7. The extendable drain of claim 1, wherein the housing further comprises an inflow port connected to a fluid supply line for extending the drain, the inflow port being fluidly connected to the interior volume of the housing such that fluid passes from the fluid supply line and the inflow port into the interior volume of the housing to at least partially fill the interior volume of the housing.

8. The extendable drain of claim 1, further comprising a piston fixedly connected to an outer surface of the sidewall of the drain member, the piston comprising a peripheral edge that seals against an inner surface of the sidewall of the housing.

9. The extendable drain of claim 8, wherein the piston comprises an annular plate defining an opening having a diameter corresponding to an outer diameter of the drain member.

10. The extendable drain of claim 8, wherein the piston separates the interior volume of the housing into a first volume and a second volume, and wherein at least partially filling the first volume moves the piston in a first direction causing the drain to move towards the extended position, and wherein at least partially filling the second volume moves the piston in a second direction causing the drain to move towards the retracted position.

11. The extendable drain of claim 10, wherein the housing comprises a first inflow port connected to a first fluid supply line for extending the drain, the first inflow port being fluidly connected to the first volume of the housing such that fluid passes from the first fluid supply line and the first inflow port into the first volume of the housing to at least partially fill the first volume of the housing.

12. The extendable drain of claim 11, wherein the housing comprises a second inflow port connected to a second fluid supply line for retracting the drain, the second inflow port being fluidly connected to the second volume of the housing such that fluid passes from the second fluid supply line and the second inflow port into the second volume of the housing to at least partially fill the second volume of the housing and causing the drain to move towards the retracted position.

13. The extendable drain of claim 1, wherein the annular sleeve comprises an elastomeric material, such as silicone, neoprene, isoprene, or rubber.

14. The extendable drain of claim 1, further comprising a cap movable between a retracted position, in which the cap covers the open top of the drain member, and an extended position in which the cap is separated from the open top of the drain member so that fluid flows past the cap into the drain member.

15. A drainage system for a bunker, the system comprising:
   a plurality of the extendable drains of claim 1 at least partially buried below a surface of the bunker; and
   at least one drain conduit fluidly connected to the drain members of the plurality of extendable drains,
   wherein the at least one drain conduit is positioned so that water flowing through the drain members of the plurality of extendable drains flows into the drain conduit and away from the bunker.

16. The drainage system of claim 15, further comprising at least one fluid supply line for transporting water from at least one water source to interior volumes of the housings of the plurality of extendable drains to cause the plurality of extendable drains to move to the extended position.

17. The drainage system of claim 16, further comprising at least one valve for controlling flow of water from the at least one water source to the interior volumes of the housings of the plurality of extendable drains through the at least one fluid supply line.

18. The drainage system of claim 17, further comprising an automatic activation system comprising:
   at least one sensor configured to detect information indicating that water is collecting in the bunker, and
   at least one controller electrically connected to the at least one sensor and to the at least one valve for controlling water flow from the at least one water source to the plurality of extendable drains, the at least one controller configured to:
      receive and process signals from the at least one sensor, and
      cause the at least one valve to open when the received and processed signals indicate that water is collecting in the bunker, such that water flows from the water source, through the at least one valve, and into the interior volumes of the plurality of extendable drains.

19. The drainage system of claim 18, wherein the at least one sensor comprises at least one of a moisture sensor, a water pressure sensor, an optical sensor, or any combination thereof.

* * * * *